United States Patent
Eick et al.

(10) Patent No.: US 8,467,267 B2
(45) Date of Patent: Jun. 18, 2013

(54) ASYNCHRONOUS OPERATION OF SEISMIC SOURCES IN A SEISMIC SURVEY

(75) Inventors: Peter M. Eick, Houston, TX (US); Joel D. Brewer, Houston, TX (US); Stephen K. Chiu, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 784 days.

(21) Appl. No.: 12/604,841

(22) Filed: Oct. 23, 2009

(65) Prior Publication Data

US 2011/0013482 A1    Jan. 20, 2011

Related U.S. Application Data

(60) Provisional application No. 61/109,279, filed on Oct. 29, 2008.

(51) Int. Cl.
| | | |
|---|---|---|
| *G01V 1/02* | (2006.01) | |
| *G01V 1/28* | (2006.01) | |
| *G01V 1/00* | (2006.01) | |
| *G01V 1/36* | (2006.01) | |

(52) U.S. Cl.
CPC ............ *G01V 1/005* (2013.01); *G01V 2210/12* (2013.01); *G01V 2210/20* (2013.01); *G01V 1/368* (2013.01)
USPC .......................................................... 367/38

(58) Field of Classification Search
CPC ............ G01V 2210/12; G01V 2210/20; G01V 2210/121; G01V 2210/1212; G01V 1/02; G01V 1/28; G01V 1/36; G01V 1/364; G01V 1/368
USPC ..................... 367/50–52, 37–42, 56; 702/14, 702/17, 18
IPC ........................................................ G01V 1/36
See application file for complete search history.

(56) References Cited

U.S. PATENT DOCUMENTS

| | | | | |
|---|---|---|---|---|
| 2,989,726 A | | 6/1961 | Crawford et al. | |
| 3,697,938 A | * | 10/1972 | Taner | 367/39 |
| 3,984,805 A | * | 10/1976 | Silverman | 367/190 |
| 4,168,485 A | * | 9/1979 | Payton et al. | 367/41 |
| 4,201,972 A | * | 5/1980 | Edwards et al. | 367/40 |
| 4,223,399 A | * | 9/1980 | Hackett | 367/41 |
| 4,405,999 A | * | 9/1983 | Zachariadis | 367/23 |
| 4,646,274 A | * | 2/1987 | Martinez | 367/41 |
| 4,899,321 A | * | 2/1990 | Solanki | 367/48 |
| 4,953,657 A | | 9/1990 | Edington | |
| 5,077,697 A | * | 12/1991 | Chang | 367/31 |

(Continued)

FOREIGN PATENT DOCUMENTS

GB    2359363    8/2001

OTHER PUBLICATIONS

Stephen K Chiu, Charles W Emmons and Peter P. Eick, "High Fidelity Vibratory Seismic (HFVS): Robust Inversion Using Generalized Inverse", SEG/Houston 2005 Annual Meeting, XP-002624677, pp. 1650-1654.

*Primary Examiner* — Mark Hellner
*Assistant Examiner* — Ari M Diacou
(74) *Attorney, Agent, or Firm* — ConocoPhillips Company (57) ABSTRACT

Seismic systems and methods are provided to collect variable seismic data, for coordinating source energy and receiver data as well as using both to obtain high resolution seismic data.

21 Claims, 9 Drawing Sheets

U.S. PATENT DOCUMENTS

| | | | |
|---|---|---|---|
| 6,418,079 B1 * | 7/2002 | Fleure | 367/40 |
| 6,545,944 B2 * | 4/2003 | de Kok | 367/56 |
| 6,807,508 B2 * | 10/2004 | Becquey | 702/124 |
| 7,376,046 B2 * | 5/2008 | Jeffryes | 367/41 |
| 7,639,567 B2 * | 12/2009 | Sitton et al. | 367/189 |
| 2002/0064089 A1 * | 5/2002 | Ambs | 367/23 |
| 2003/0093224 A1 * | 5/2003 | Jeffryes | 702/14 |
| 2006/0164916 A1 | 7/2006 | Krohn et al. | |
| 2008/0219094 A1 * | 9/2008 | Barakat | 367/21 |
| 2009/0073807 A1 * | 3/2009 | Sitton et al. | 367/38 |
| 2010/0149922 A1 * | 6/2010 | Sitton et al. | 367/92 |

* cited by examiner

ASYNCHRONOUS OPERATION OF SEISMIC SOURCES IN A SEISMIC SURVEY

PRIOR RELATED APPLICATIONS

This application is a non-provisional application which claims benefit under 35 USC §119(e) to U.S. Provisional Application Ser. No. 61/109,279 filed Oct. 29, 2008, entitled "VARIABLE TIMING ZENSEIS™," which is incorporated herein in its entirety.

FIELD OF THE DISCLOSURE

The present disclosure generally relates to methods and apparatus for generating seismic signals, and particularly to methods of synchronizing at both the source and receiver during seismic data acquisition.

BACKGROUND OF THE DISCLOSURE

Seismic surveys image or map the subsurface of the earth by imparting acoustic energy into the ground and recording the reflected energy or "echoes" that return from the rock layers below. The source of the acoustic energy can be generated by explosions, air guns vibrators, and the like. The energy source is positioned on or near the surface of the earth. Each time the energy source is activated it generates a seismic signal that travels into the earth, is partially reflected, and, upon its return, may be detected at many locations on the surface as a function of travel time. The sensors used to detect the returning seismic energy include geophones, accelerometers, and hydrophones. The returning seismic energy is recorded as a continuous signal representing displacement, velocity, acceleration, or other recorded variation as a function of time. Multiple combinations of energy source and sensor can be subsequently combined to create a near continuous image of the subsurface that lies beneath the survey area. One or more sets of seismic signals may be assembled in the final seismic survey.

Technology continues to increase resolution and complexity of seismic systems such as high fidelity vibroseis seismic acquisition including ZENSEIS™. Vibroseis is a method used to propagate energy signals into the earth over an extended period of time as opposed to the near instantaneous energy provided by impulsive sources. The data recorded in this way must be correlated or inverted to convert the extended source signal into an impulse. The source signal using this method was originally generated by a servo-controlled hydraulic vibrator or shaker unit mounted on a mobile base unit, but electro-mechanical versions have also been developed.

Bassett, U.S. Pat. No. 3,972,019, describes accurate timing at distant points where each unit produces synchronized time pulses at time intervals which are the same in the different units and methods for synchronizing the units by direct connection with each other.

Siems and Porter, U.S. Pat. No. 4,281,403, describe a decentralized seismic data recording system including a central station and a plurality of remote seismic recording units. A master clock is provided in the central station. A local clock is provided in each remote recording unit. At the beginning of a work period, the local clocks are synchronized with the master clock. Thereafter, a plurality of seismic data recordings is made. At the end of a work period, the time difference due to tuning drift between the master clock and each respective local clock is ascertained and is recorded. The time difference is linearly prorated over the recordings made during the work period, thereby synchronizing the time base of each seismic data recording with the master clock.

Kostelnicek and Montes, U.S. Pat. No. 4,879,696, describe a method for initiating seismic data storage in an Isolated Distributed Recording System, including the steps of: (a) generating an encoded seismic signal, utilizing an acoustic energy source, which will penetrate to a sub-surface refractive horizon; (b) detecting a refraction of said controlled seismic signal from the refractive horizon with at least one isolated distributed recorder; (c) correlating said refracted seismic signal with a pre-selected correlating signal; and (d) upon correlation between said correlating signal and said refracted seismic signal, triggering the isolated distributed recorder to store incoming seismic data. A Time Synchronization System may be employed for accurately referencing the time of arrival at the isolated distributed recorder of the encoded signal, or all seismic data and information associated with the generation of the encoded signal, to the time said encoded signal or seismic data and information were generated by the acoustic energy source. Generally, such a system would include an accurate clock or other similar timing device at the central station, and each isolated distributed recorder would also have an equally accurate timing device or "local" clock in relationship with the timing device at the central station. Usually, the local clocks are synchronized with the clock at the central station prior to the initiation of active seismic exploration activities.

Reed, et al., U.S. Pat. No. 4,885,724, describe a cableless seismic digital recording system which records seismic-trace data generated by any type of seismic source, including high energy impulsive seismic sources and low energy surface seismic sources such as vibrators. A seismometer is connected to a remotely deployed radio-controlled portable recorder which contains circuitry for sampling, digitizing, processing, storing, and recording seismic-trace data. Coded radio signals instruct each recorder to commence an operation or sequence of operations from a predetermined set of programmed instructions stored in program read only memory included in each recorder. Such operations include seismic-trace data acquisition; optional weighting and vertical stacking; normalization; recording; and seismic source initiation (abstract and p. 8, 1.25-33).

Sallas, et al., U.S. Pat. No. 5,721,710, describe a method where multiple vibratory sources are activated simultaneously and the earth response, for each vibrator-geophone path is obtained. This is done by measuring the vibrations at the sources and at the geophone stations over a number of frequency sweeps. The inverse matrix of the source vibrations is applied to the recorded geophone vibrations at each frequency to derive the transfer function corresponding to the earth response for each vibrator-geophone path in the survey. An earth reflectivity function may be derived for each vibrator-geophone path by applying a minimum phase filter to the separated vibrator-geophone transfer functions.

Harmon, U.S. Pat. No. 6,002,640, describes use of a Series of nearly Identical Seismic Shots (SISS) to generate a system synchronization signal and instruct remote units. The timing and information contained in the SISS can be used to synchronize and communicate with the data acquisition unit(s).

Moldoveanu, U.S. Pat. No. 6,754,590, describes deploying at least one seismic sensor; deploying a plurality of vibratory seismic sources at different source points; simultaneously actuating said seismic sources; acquiring seismic data attributable to said seismic sources using said seismic sensor; redeploying said seismic sources so that at least one of them is positioned at a source point previously occupied by another of them; simultaneously actuating said redeployed seismic sources; acquiring seismic data attributable to said redeployed seismic sources using said seismic sensor; decomposing said acquired seismic data into components attributable to each said seismic source; and stacking together components attributable to seismic sources located at a common source point.

Maxwell, et al., U.S. Pat. No. 6,883,638, describes a method of acquiring seismic data and for operating and testing a sensor assembly. The sensor assembly preferably includes accelerometers with axes of sensitivity orthogonal to each other. The method preferably includes determining sensor tilt angle, determining the position of the sensor, and synchronizing the operation of the sensor (abstract and claim 1). According to one aspect of the patent, an apparatus for synchronizing the operation of a sensor to a common time base is provided that includes a sensor module adapted to sensing seismic energy and the sensor module further includes a global positioning system receiver adapted to synchronize the operation of the sensors. It also includes a seismic recorder coupled to the accelerometers which also includes a GPS receiver adapted to synchronize the sensor.

Iseli, et al., U.S. Pat. No. 7,012,853, describes a method of seismic data acquisition, comprising: a) sensing acoustic energy with a plurality of sensors, each sensor providing an output indicative of the sensed energy; b) collecting a plurality of time samples of each sensor output; c) forming one or more data packets with the collected plurality of time samples: d) adding one or more characterizing bits to the data packets, the characterizing bits representing the time of only the first time sample within the data packet; e) storing the data packets in predetermined memory locations in a field unit; and f) transmitting the data packets. A synchronizing signal is included in the data packets (claims 13 and 16).

Allen, WO9718491 and EP0861450, describe pre-processing seismic data generated by multiple vibrating sources using high resolution or high fidelity data processing. A signal directly related to the actual signal that the vibrator is sending into the ground is used in pre-processing to couple the baseplate motion with signals actually transmitted through the ground.

Longaker, WO0116622, describes a method and apparatus for controlling vibroseis sources in survey operations. A wireless local area network establishing a communications link among vibroseis sources operating in a group may enable the group to operate independent of a remote control unit and may also provide a distributed system solution that mitigates communication difficulties between the sources and the remote control unit (abstract).

Krohn and Johnson, WO2005019865, describe a method for improving the efficiency of acquiring vibratory data with HFVS techniques. With the HFVS method, data from a number of vibrators shaking simultaneously in seismic proximity to one another are separated by using (in one embodiment) a number of phase encoded sweeps, where the number of sweeps is greater than or equal to the number of vibrators, resulting in a set of linear equations that can be solved simultaneously. The record length for each sweep includes an associated listen time containing reflections. The present invention eliminates the unproductive listening time for multiple sweeps but still provides the ability to separate the vibrator records and reduce contamination from harmonics. Production rates can be increased by as much as 30-80% (par.0025).

Willen and Summerfield, WO2007040743, describe controlled source electromagnetic surveys of subterranean regions using two or more electromagnetic transmitters such that the combined responses at a receiver can be separated as determined by waveform periodicities. The methods used to synchronize clocks associated with multiple receivers and transmitters are the same as those methods used to acquire and process data from a single transmitter.

Current systems require contact, either radio or direct contact before, during, and after the seismic survey to synchronize the vibrational sources within microseconds to achieve a uniform signal. Much time and effort is exhausted to synchronize sources across a variety of terrains, under a variety of conditions that are not always amenable to communications either visually or through radio, laser, satellite, cell phone, or other communication methods.

Current systems do not provide an inexpensive and accurate method to synchronize multiple independent sources required for HFVS. Current systems also cannot be used with the variety of source/receiver data formats available for seismic acquisition. What is required are inexpensive and simple methods to synchronize receiver signals from a variety of sources.

BRIEF DESCRIPTION OF THE DISCLOSURE

Prior studies have used the HFVS concept combining unique sweep encoding of ZENSEIS™ and timing synchronization provided by a conventional GPS unit present at the central recorder. They do not use the unique attributes of a source point recorder identical to recorders used in the field. There are multiple methods described in previous studies for the extraction of seismic data for a single seismic record without synchronizing the boxes (distributed recorders), and although each must maintain absolute time, they do not describe the use of multiple distributed GPS units or the use of source point recorders as a method of synchronizing time, seismic signals or both time and seismic signals simultaneously.

Energy sources or "source" includes ZENSEIS™, vibroseis, seismic vibrators, airguns, plasma shots, dynamite, and other sources known to one of ordinary skill in the art. Seismic vibrators include trucks, tractors, trailers, boats or ships, submarines, subterranean, or other sources that have a base plate that can be brought into contact with the earth or water. A reaction mass is vibrated at varying frequencies against the baseplate to produce vibratory motion (transmit vibration energy) which travels downward into the earth via the base plate. A survey may be designed that uses multiple energy sources, each being activated simultaneously so that the recording instruments capture a composite signal with contributions from multiple vibrators. The composite signal forms a record that may be either intentionally composite or separable through data inversion. A variety of programs are available to generate differing source patterns controlled in space, time, and frequency.

In vibroseis the seismic energy source is distributed over a period of time. This distribution of energy over time creates a distinct signal, such as a sweep, in which the signal changes systematically from low frequency at the beginning to high frequency at the end of the source. Dependent upon the desired signal, number of vibroseis being conducted simultaneously, and transmission properties of the ground, different seismic sweeps may be developed. Computer processing of the seismic signals uses the distinct characteristics of the sweep to "collapse" the energy into short duration wavelets. ZENSEIS™ sources include vibroseis, seismic vibrator, and combinations thereof. Other multiple source seismic surveys include high fidelity vibratory seismic (HFVS), cascaded HFVS, combined HFVS, slipsweep, and the like.

"Simultaneous" sweeps are conducted by two or more seismic sources during overlapping periods of time. In contrast, synchronous sweeps are conducted by two or more seismic sources started and stopped at the same time. Using a starting pulse signal, computer control, or other coordinated methods, synchronized vibrators on a seismic survey may be started within milliseconds to generate a synchronous seismic signal. During synchronous seismic surveys the source vibrator frequency, phase, amplitude, and the like, may be synchronized to reduce interference, enhance signal, or otherwise enhance or modify the recorded data. Using a "simultaneous" sweep the source signals may have a "lag" either by design or unintentionally. In one embodiment, source signals are intentionally designed with a lag from 1 ms to 10 seconds wherein the lag allows independent signal encoding. In another embodiment, seismic sources are given one or more positions and time window but are operated independently. When the seismic sources are operated independently an arbitrary lag is created due to the asynchronous (or random) operation of the sources.

Receivers include geophones, hydrophones, accelerometers, electrodynamic receivers, and the like. Receivers may receive one or more than one type of data including vibrational and acceleration data. Vibrational data may be measured between about 1 Hz to 2 KHz, including data from 6 to 80 Hz, about 20 to 40 Hz, or simply all data less than 160 Hz, and combinations thereof. Receivers may include a recorder or transmit data to a remote recorder. A recorder includes receiver/recorder combinations that automatically record data from the receiver including systems that record data at the receiver and those that record data at a remote location. In a preferred embodiment, data is stored in a temporary drive at the receiver until it is transferred either physically or wirelessly to a central recorder for data analysis.

A "source point recorder" is one or more recorders positioned on or at the energy source identical to recorders positioned farther from the source (field recorders). The source point recorder is typically located at the base of the energy source, adjacent to the energy source, or very near the energy source as long as, in the system being used, the source point recorder is statistically and electronically similar to recorders located at the origin of the source. In some systems, the source point recorder may be located up to 10 meters from the energy source and still record data statistically identical to that at the energy source. In other systems, where multiple sources are used, the source point recorder may be located at one of many energy sources, may be located between multiple energy sources, and/or multiple source point recorders may be located at one or more energy sources.

Seismic recording systems are disclosed with two or more seismic energy sources and one or more data recorders, operated asynchronously by recording energy source signatures and synchronizing the recorded data through inversion with the energy source signatures.

Methods of recording seismic data by deploying one or more seismic data receivers; deploying at least one source point recorder comprising a seismic data receiver; transmitting seismic energy from a seismic energy source; and recording seismic data from each recorder.

Methods of recording seismic data include deploying more than one seismic data recorder comprising a data receiver; transmitting seismic energy from a seismic energy source with a source point recorder; and simultaneously recording source energy data (source signature) and seismic data.

Energy sources can be selected from ZENSEIS™, vibroseis, seismic vibrator, high fidelity vibratory seismic (HFVS), cascaded HFVS, combined HFVS, and the like. Data recorders include geophones, hydrophones, accelerometers, electrodynamic receivers, and the like.

The seismic recording system of claim 8, wherein said seismic data recorder comprises one or more data receivers selected from the group consisting of a geophone, hydrophone, accelerometer, gravitometer, electrodynamic receiver, and combinations thereof.

DETAILED DESCRIPTION OF EMBODIMENTS OF THE INVENTION

The present invention provides methods to improve timing of seismic sources and receivers to better analyze data. The accuracy is improved by having an accurate and independent method of synchronizing equipment for continuous seismic recorders, ZENSEIS™, and other high fidelity vibroseis techniques. The use of this technique, with independent sources, allows the design of individual "single or point source surveys" to run simultaneously providing more robust data in a cost effective manner.

Previously, in U.S. Pat. No. 7,295,490 we have shown that the most effective vibroseis phase encoding scheme may be determined by analyzing the Eigen values and condition numbers available for a given seismic survey. In US20080137476 methods are described that use the geometric relationship of vibrators and seismic surveys to define locations for sources/receivers from multiple groups of seismic vibrators continuously without interruption. Additionally, U.S. application Ser. No. 11/855,776 demonstrates correcting receiver data using a proximal source to detect and remove noise. Finally, U.S. application Ser. No. 11/933,522 uses phase encoded vibratory signals to separate multiple sources at one or more receivers. Application 61/109,403 filed Oct. 29, 2008, describes a marine vibroseis system. Finally, U.S. Application 61/109,329 filed Oct. 29, 2008, describes synchronizing sources and receivers with a vibroseis system. These prior patents and applications are incorporated by reference. Because of the highly precise information encoded in vibratory signals, methods are required to synchronize seismic recording that allows extraction of phase signals from one or more sources and received by one or more receivers. The system should provide universal methods whether marine, land based, on ice, or in other adverse and remote environments around the world. The system must be durable and able to withstand an extreme range of temperatures, weather, and moisture conditions.

To synchronize seismic systems with a variety of source, receiver, recorder combinations a new and inexpensive system is provided that allows accurate synchronization and decoding of complex seismic data. Provided is a source point recorder and synchronization techniques that allows accurate time records with varying equipment including the energy source, the receivers, and the central recorder.

The present invention will be better understood with reference to the following non-limiting examples.

Variable Timing

Often, two or more vibrators are deployed during a survey. Standard practice is to initiate all sources simultaneously using a controlled system either programmed to start simultaneously or controlled by radio signal. Costs are increased by managing and synchronizing the multiple sources and increase exponentially as the size of the survey increases.

Using the current invention continuous data recorders document data prior to, during and after the completion of the seismic survey both on the earths surface or subsurface and at or near the seismic source. By recording the start time of each seismic source the listening time can be adjusted to coordinate the data to the microsecond scale required for high resolution. Additionally, it is shown herein that the signals can be separated without degrading the data. Thus an asynchronous start time will not decrease survey resolution using the techniques described herein.

In a typical ZENSEIS™ survey two or more (often there will be four) seismic vibrators are operated simultaneously. In such an instance, the data recorded during the survey by geophones or other recording devices, can be represented mathematically according to the standard convolutional model as follows:

$$d_i(t) = \sum_{j=1}^{n} g_{ij}(t - q_j) \otimes m_j(t) \text{ for } i = 1, k \quad (1)$$

where $d_i(t)$ contains the recorded data for sweep i, i=1,k, (i.e., the data trace that resulted from the combined operation of all n vibrators simultaneously during the ith sweep), index j, j=1,n, represents the number of vibrators, $q_j$ is the source delay associated with each vibrator, $m_j(t)$ is the generally unknown earth reflectivity model at vibrator j, $g_{ij}(t-q_j)$ represents the signal generated by vibrator j during sweep i, and ⊗ represents the convolution operator.

Of course, what is ultimately of interest is the earth reflectivity model M at each vibrator $m_j(t)$. In the frequency domain, equation 1 in matrix notation becomes $$D(f)=G(f)M(f). \quad (2)$$

The least-squares solution of equation 2 is $$G^H G M = G^H D. \quad (3)$$

The matrix inversion may be numerically unstable; an extra term $\beta^2 I$ is often added to the matrix $G^H G$ to make the inversion stable. $\beta^2$ is a constant or prewhitening, and I is an identity matrix. This gives a stabilized least-squares estimate $$(G^H G + \beta^2 I)M = G^H D. \quad (4)$$

A fast equation solver such as LU decomposition can solve this system of equations.

Alternatively, the least-squares solution of equation 3 is solved using a singular value decomposition, G becomes:

$$G=USV^H, \quad (5)$$

where U is a matrix of eigenvectors that span the data space, V is a matrix of eigenvectors that span the model space, S is a diagonal eigenvalue matrix whose diagonal elements are called singular values, and H is a conjugate transpose operator.

The generalized least-squares solution of M is:

$$M=(G^H G)^{-1} G^H D=VS^{-1}U^H D. \quad (6)$$

The singular value analysis can reveal the uniqueness of the matrix to be solved. If some of the eigenvalues are close to zero, the matrix is ill conditioned. Larger eigenvalues usually represent signals of the data and smaller eigenvalues correspond to noise of the data. By excluding some of the small eigenvalues, we throw away a subset of corrupted equations to obtain a more reliable solution. The threshold of excluding small eigenvalues is usually a few percent of the largest eigenvalue.

Using the algorithms and processes described herein allows: 1) variable source start times as long as source signatures are recorded and listening time is adjusted accordingly; 2) source delay up to the sweep length; 3) methods of compensating listening time dependent upon source delay. In one embodiment the source delay is limited to less than half of the sweep length. In another embodiment the listening time is equal to or greater than the greatest source delay time. In one example, for a maximum source delay of 3.2 sec, the listening time is increased equal to or greater than 3.2 sec. Without the present processes, source delays are not compensated and the results cause serious degradation of the signal. Correction of multiple source delays by adjusting the listening time has not been previously described.

Figure 1:
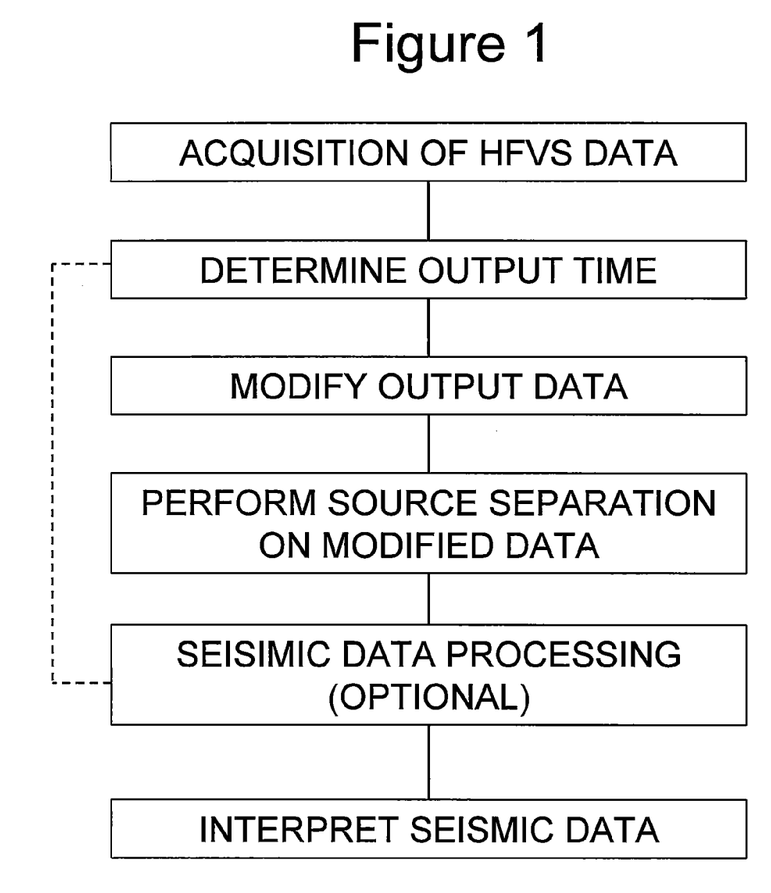
FIG. 1: Flow diagram showing data analysis

The diagram in FIG. 1 demonstrates the process of separating multiple seismic data with different output times. By recording the output time of the vibrational sources, acquired seismic data including HFVS, ZENSEIS™ or similar inversion based multiple source data can be modified by adjusting the listening time to greater than or equal to the lag time between vibrational sources. The data can then be source separated and the seismic data may be processed and/or interpreted.

Source Point Recorder

If the Vibroseis source signature capture device (source point recorder) is the same type of recording device as used in the field, then seismic data records could be used to determine start time. This involves measuring the onset of energy in the pilot sweep or signature on the same type of hardware that the seismic trace data is recorded on; then the relative timing errors to absolute time are inconsequential and the recorders do not have to be synchronized at the start of the sweep. Once all of the data from the recorders are collected and the data is time synchronized to each other or to an internal timing pulse, the start of each record can be easily determined by measuring the onset of energy in the pilot sweep. This allows extraction of the data for a single seismic record without synchronizing the boxes or maintaining absolute time at each of the recorders.

In this non-limiting example autonomous data recorders as described in U.S. Patent Application 61/112,875 filed Nov. 10, 2008, are placed in a grid to cover the target area. A variety of grids are available based on the depth of the target area, complexity of the geological structures, and resolution required. In this grid, the data recorders are positioned with a GPS at 10 meters apart for 1 km² and the seismic data receiver is placed near or on the surface. Each survey point is taken within ~1 m of a seismic data receiver, thus the data receiver records the energy transmitted into the ground at the time of transmission. The receivers may be located at the surface or at a variety of depths dependent upon the weathering, environment, and equipment available. The receiver may located at 0 m, 0.1 m, 0.25 m, 0.5 m, 0.75 m, 1 m, 2.5 m, 5 m, 7.5 m, 10 m or greater depth and at any interval between 0.1-20 meters. The energy source may be on the source point recorder, adjacent to the source point recorder or up to 5 m from the source point recorder depending on the survey design. The source point recorder must be statistically equivalent to 0 m based on the survey design. In a preferred embodiment one source point recorder is placed adjacent to the energy source prior to each survey. Seismic data including HFVS, ZENSEIS™, slip-sweep, or other source can be collected and transmission can be observed over the entire survey area. Changes in transmission signal and lag time can then be accounted for and the data corrected prior to processing or interpretation including separation, binning for each common midpoint, compiling, visualization and the like.

This technique is also available for marine acquisitions. A hydrophone, identical to those in the streamer, is fixed an exact distance below the seismic source (in one example 10m below the source). Thus at each shot, the source signature is recorded and the effectiveness of each shot can be recorded. Misfires or late shots are readily identifiable.

Example 1

Model Data

Figure 2:
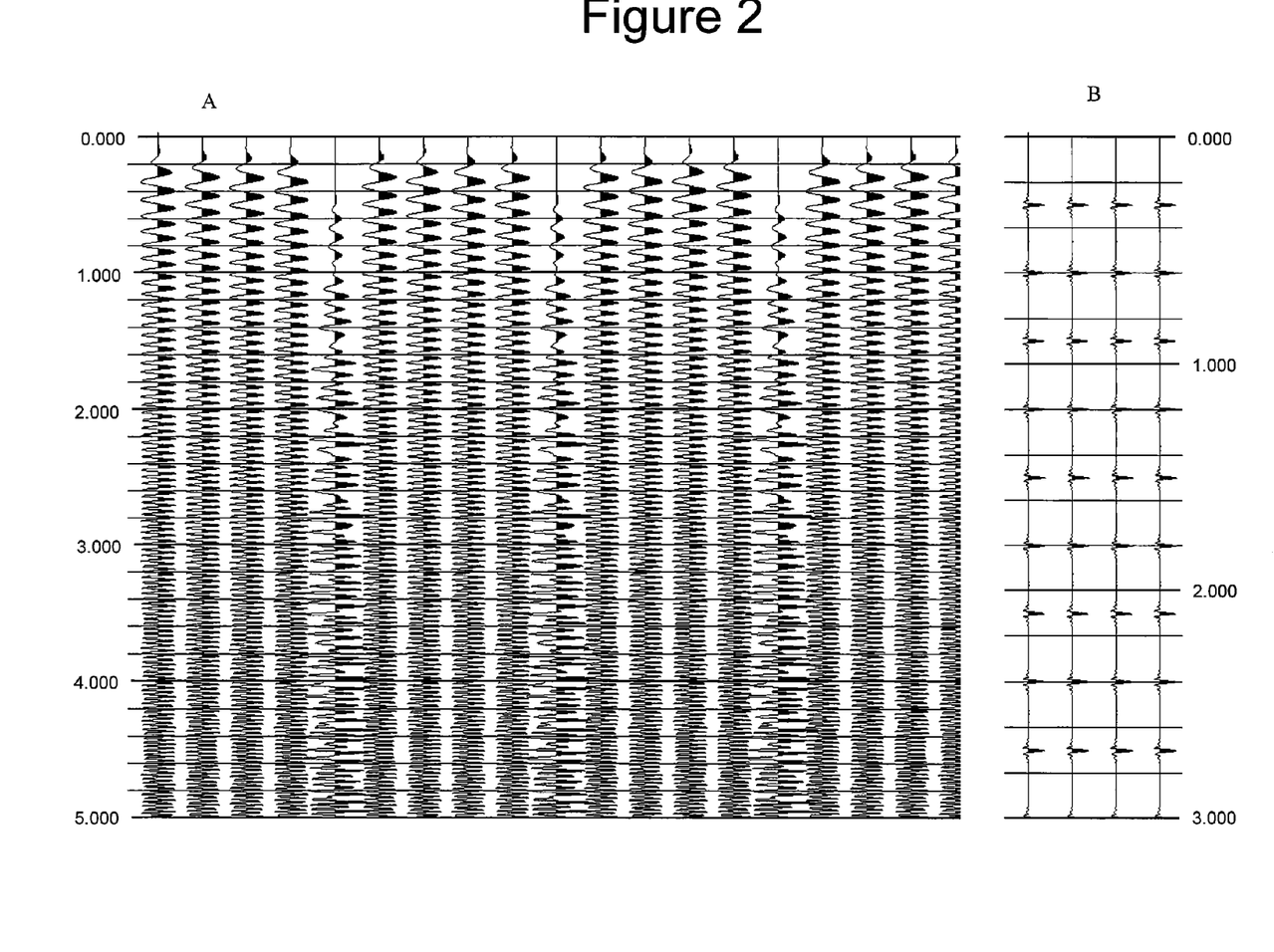
FIG. 2: No delays on source signatures with Model Data.
Figure 3:
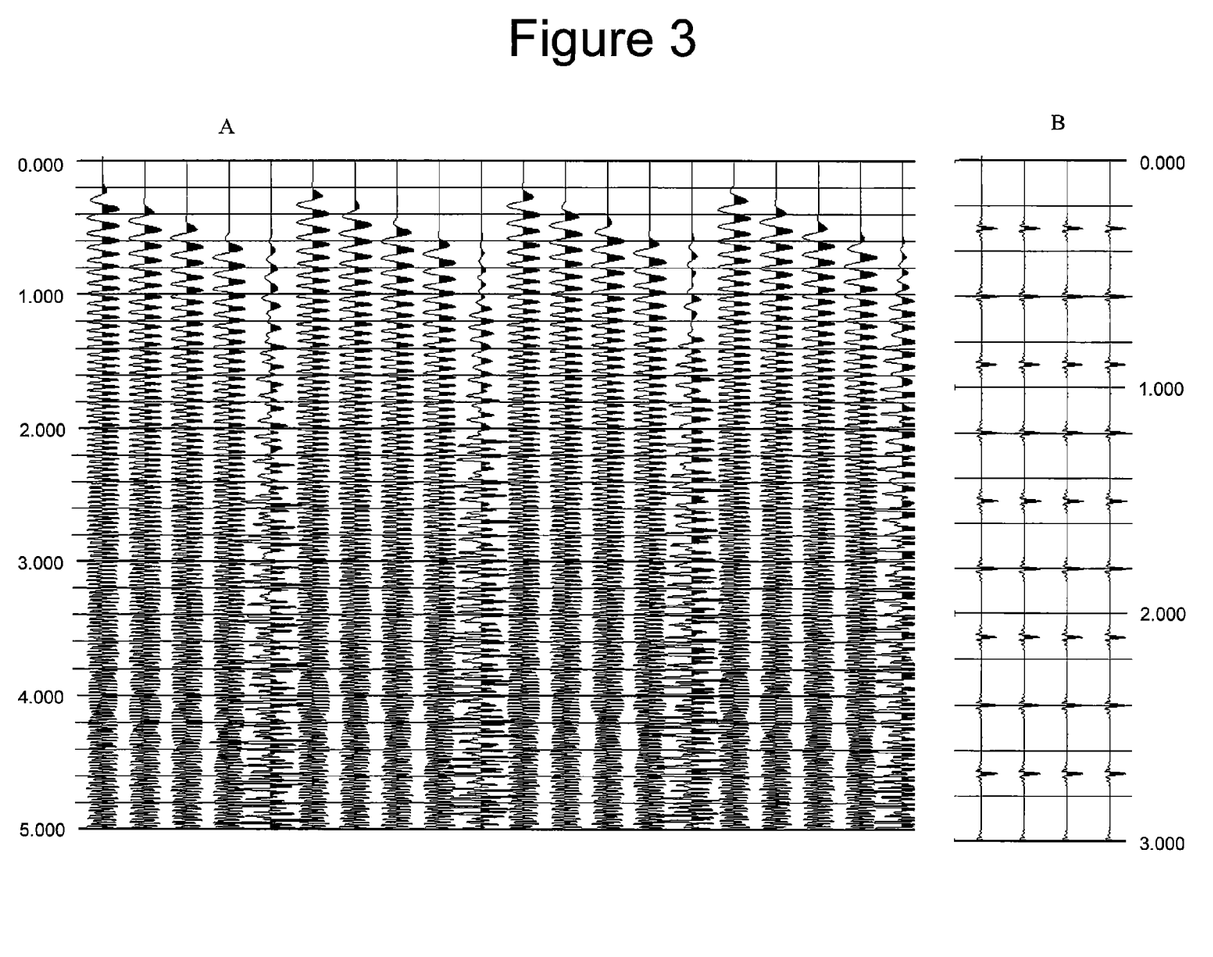
FIG. 3: Delays on source signatures with Model Data.
Figure 4:
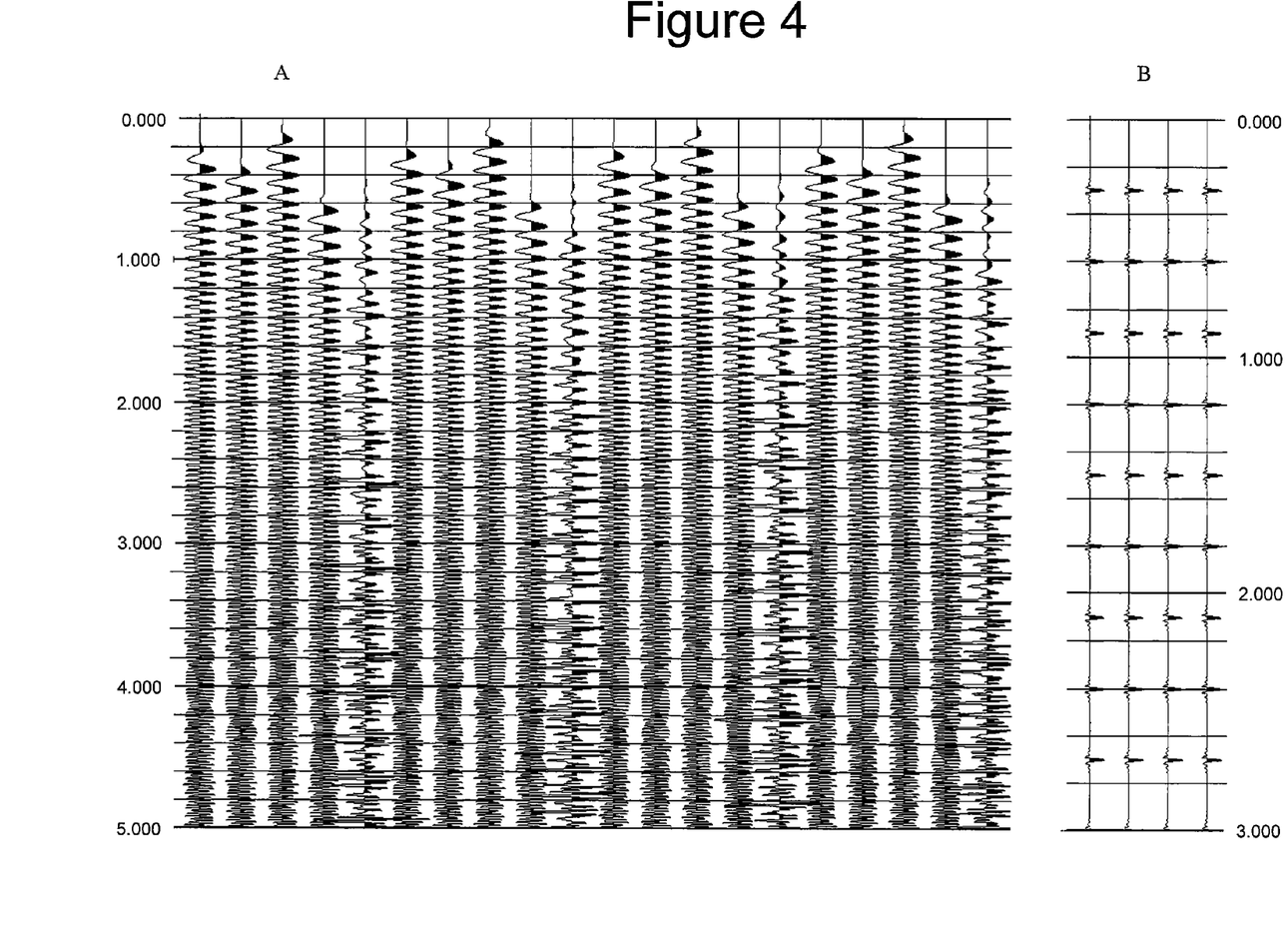
FIG. 4: Random delays on source signatures with Model Data.

FIG. 2-4 demonstrate model data wherein FIG. 2 shows separate data and the compilation if all data have the exact same start time. The data can be separated and inverted (FIG. 2B) without adjustment to the listening time because all data were produced synchronously. FIG. 3 shows data with an induced time delay between each data. The data can be separated and inverted (FIG. 3B) by adjusting the listening time even though the data were produced asynchronously. FIG. 4 shows that even with a random time delay, the data can be separated and inverted (FIG. 4B) by properly adjusting the listening time. Thus the model data demonstrate that the time delay can be applied and removed from data using a listening time adjustment.

Example 2

Modified Data

Figure 5:
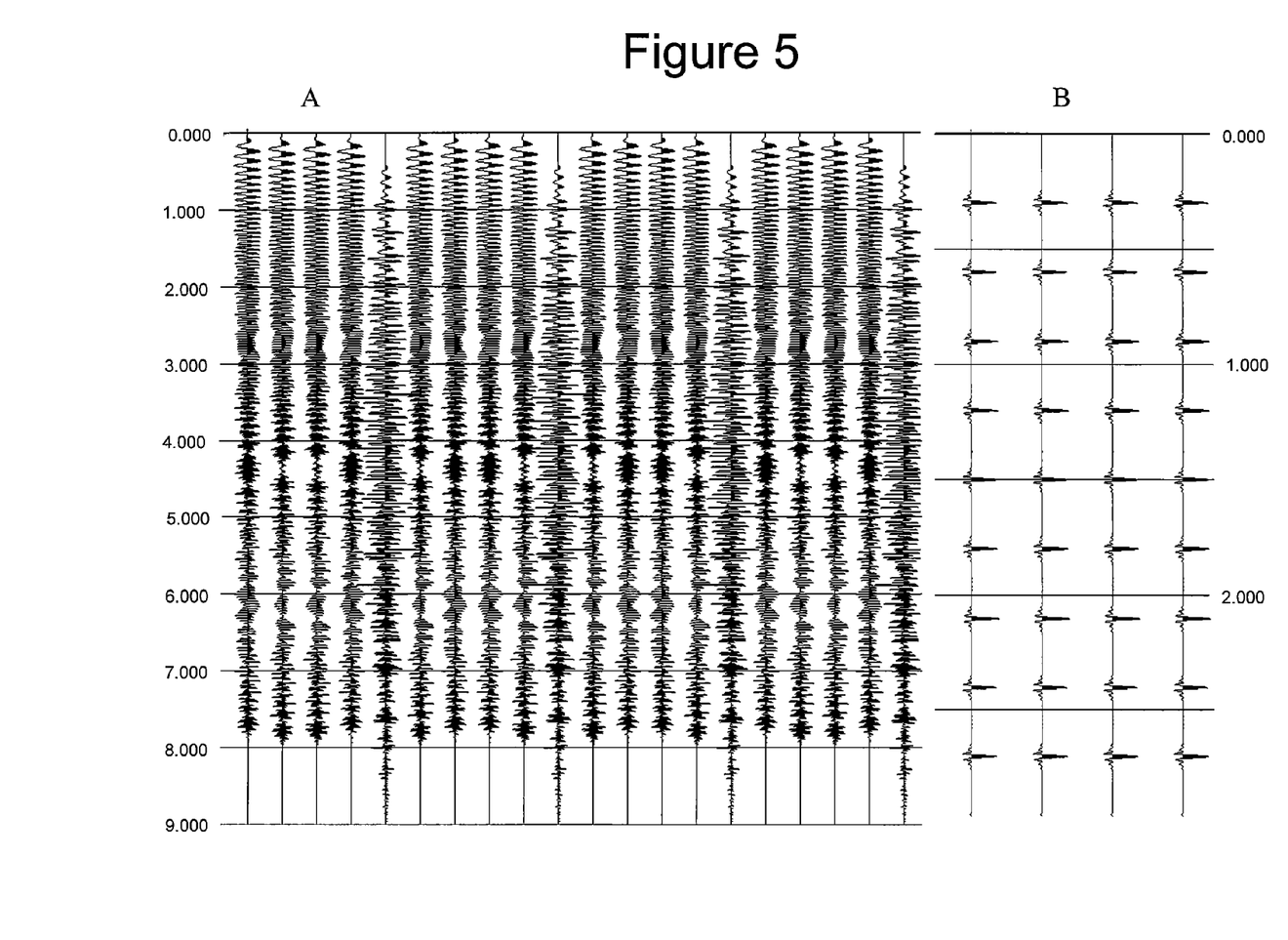
FIG. 5: No delays on source signatures: sweep length=6 sec and listening time is 3 sec.
Figure 6:
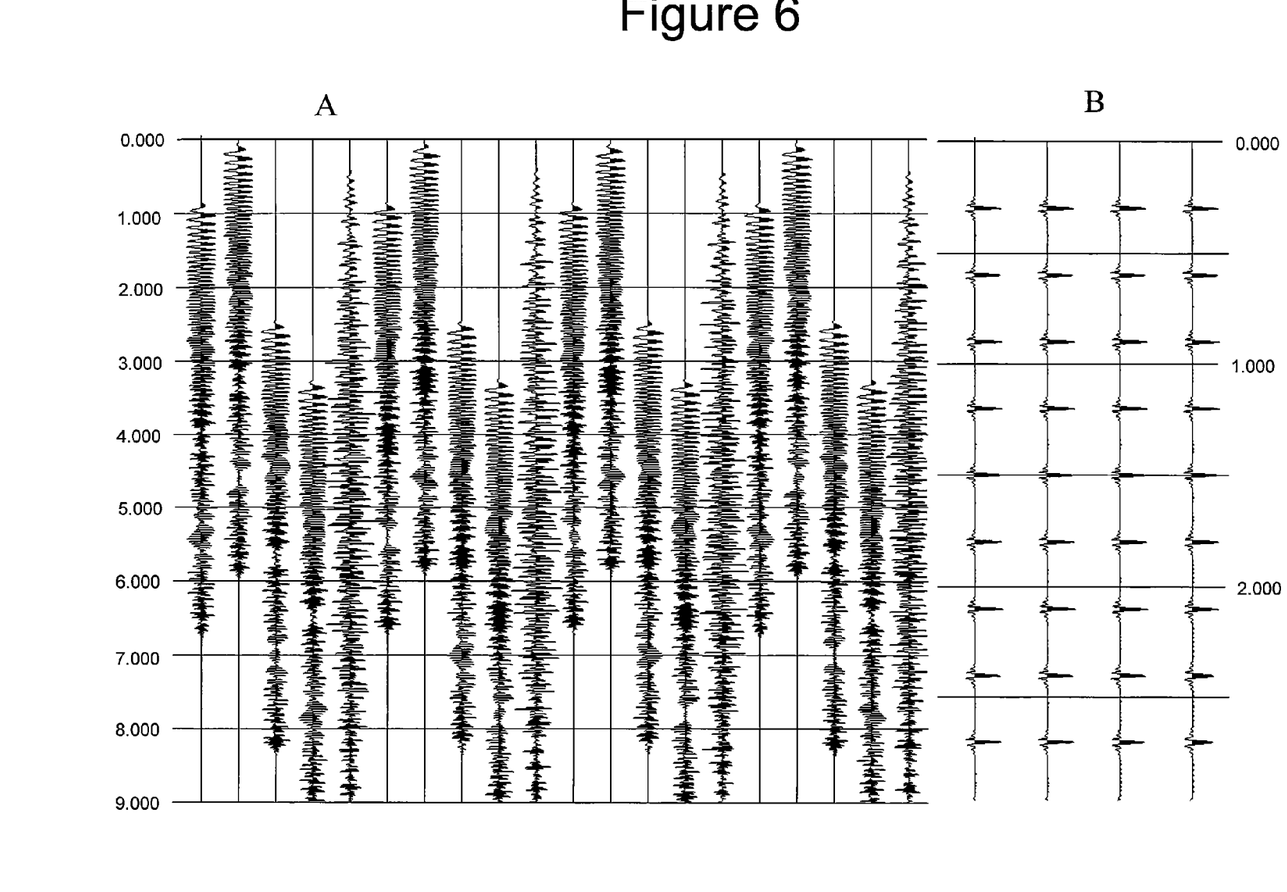
FIG. 6: Delays on source signatures—don't account for the source delay time (max 3.2 sec) in the listening time (record length is 9 sec) where sweep length=6 sec and listening time is 3 sec.
Figure 7:
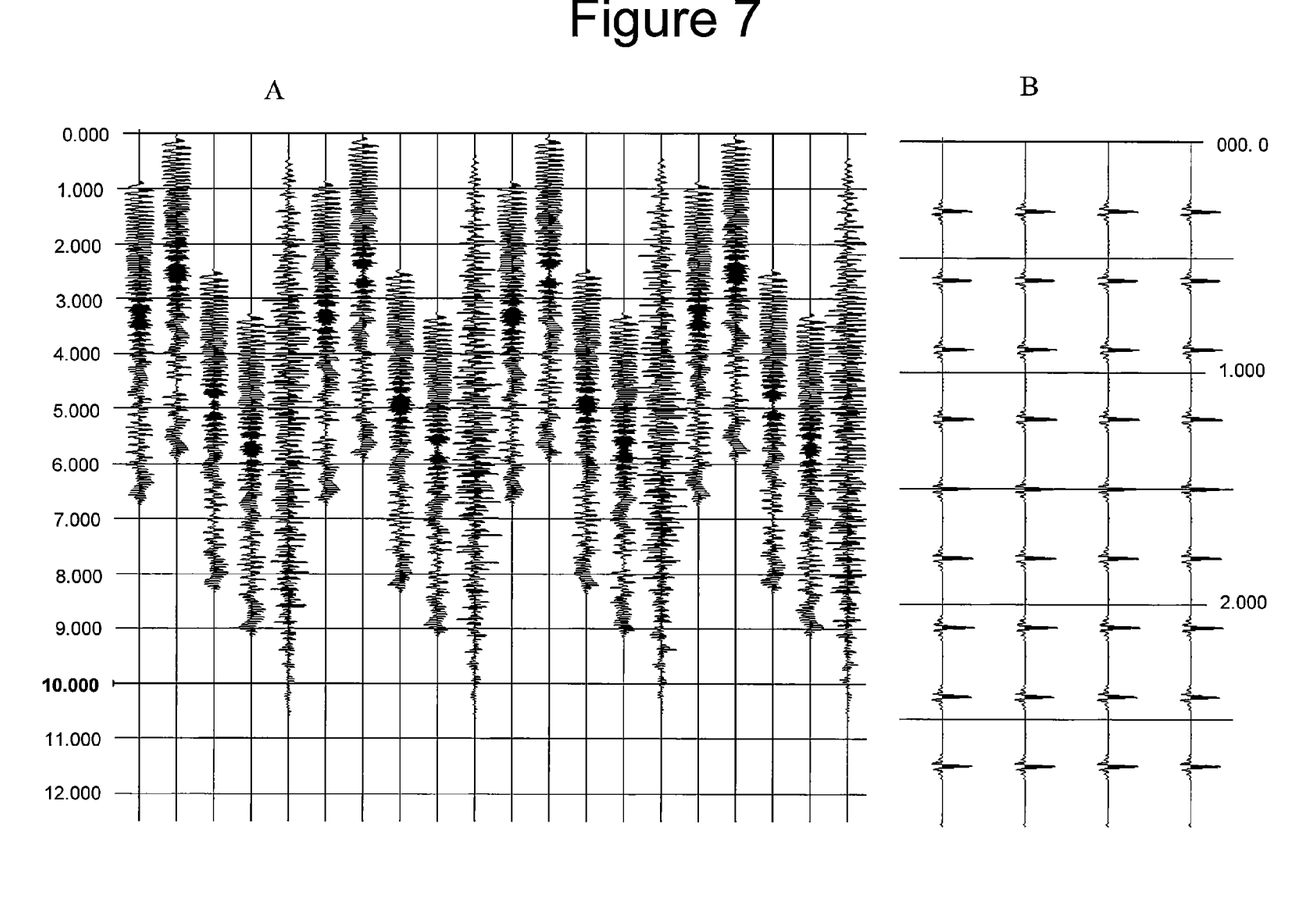
FIG. 7: Delays on source signatures—account for the source delay time (max 3.2 sec) in the listening time (add extra 3.5 second to the listening time, record length is 12.5 sec) where sweep length=6 sec and listening time is 3 sec.
Figure 8:
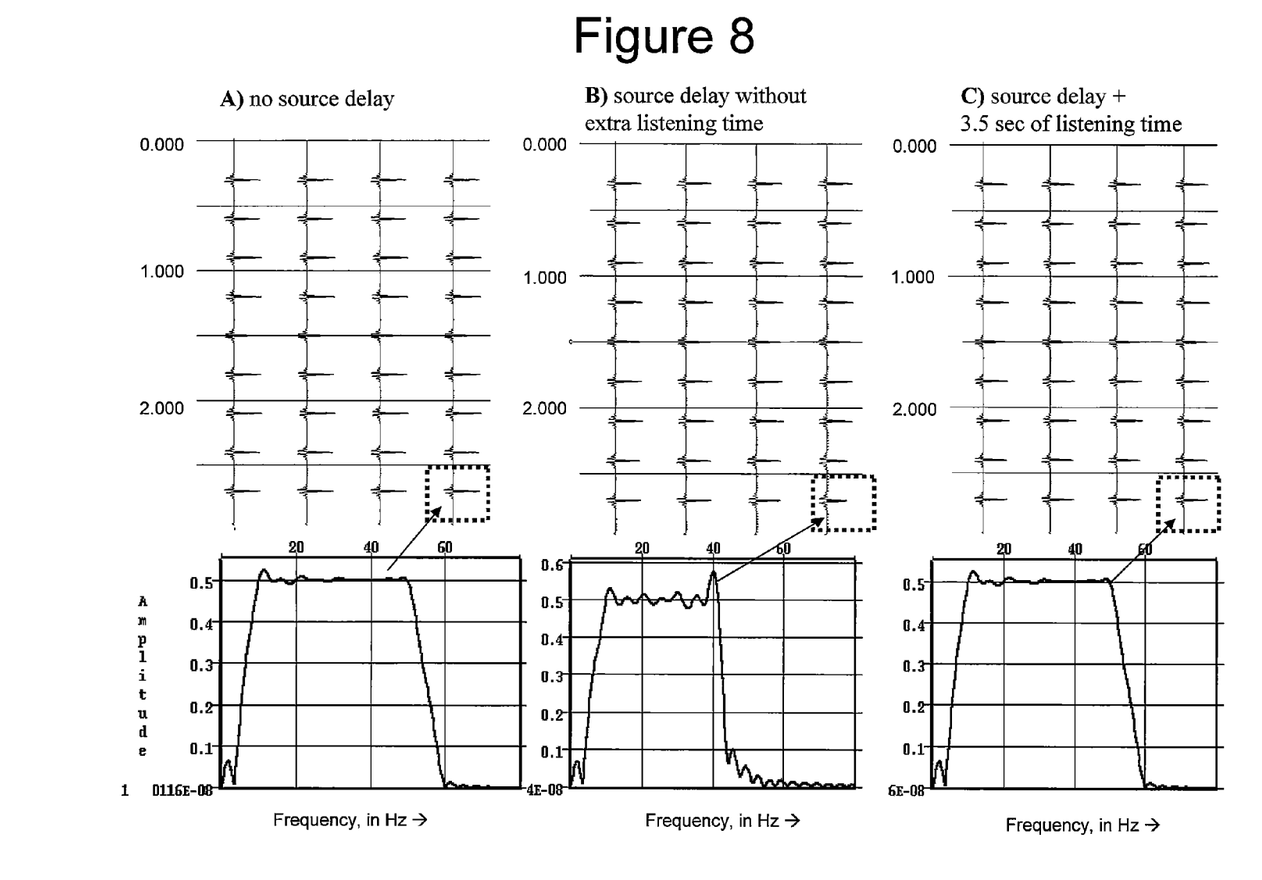
FIG. 8: Comparison of source delay and listening time effects on inversion and amplitude recovery.
Figure 9:
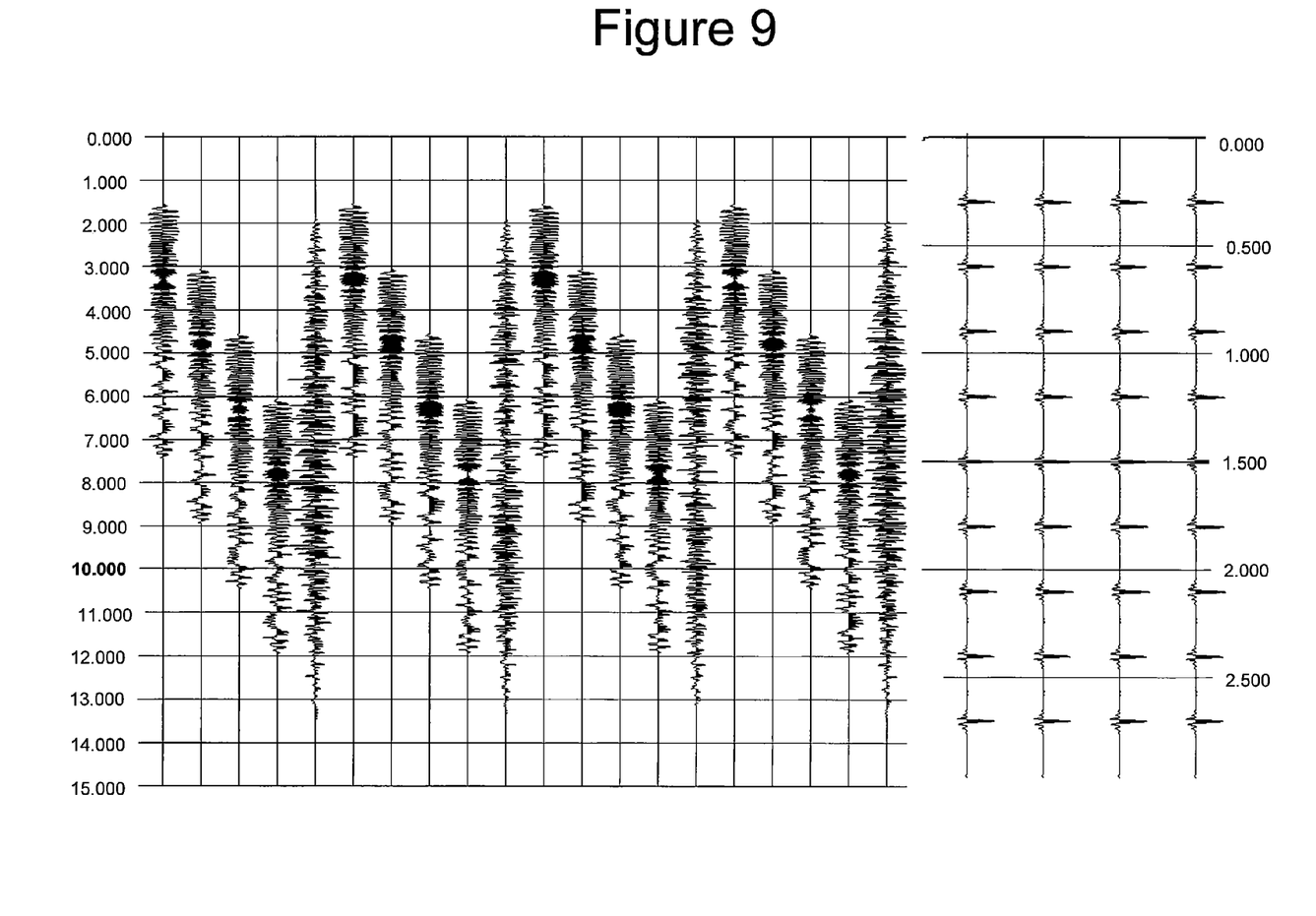
FIG. 9: Delays on source signatures—account for the source delay time (max 6 sec) in the listening time (add extra 6 second to the listening time, record length is 15 sec) where sweep length=6 sec and listening time is 3 sec.

FIG. 5-9 demonstrate another model seismic data where source signatures were assembled with a variety of lag times. FIG. 5 shows separate data and the compilation if all data have the exact same start time. The data can be separated and inverted (FIG. 5B) without adjustment to the listening time because all data were produced synchronously. FIGS. 6 & 7 show actual data with a random time delay applied between each data. The data can be separated and inverted (FIG. 6B) by adjusting the listening time even though the data were produced asynchronously. FIG. 7 shows the data full scale to demonstrate the entire length of data recorded before and after the source was applied. FIG. 8 the effect of source delay and correction on wave amplitude for the data collected. Note that without source delay, the wave amplitude is normal (FIG. 8A). When the source is delayed and no listening time is added (FIG. 8B) the wave amplitude is seriously degraded and signal is lost. But, if the listening time for the delayed source data is adjusted (FIG. 8C), the signal is not degraded and the amplitude integrity is maintained. In FIG. 9, there are multiple delays up to a maximum equivalent to the sweep length or 6 seconds in this example. The data can still be adjusted with lag time, separated and inverted properly (FIG. 9B). Thus the method can retrieve data from actual data modified with a variety of lag times. These data demonstrate that the time delay can be completely removed using a listening time adjustment.

A variety of lag time problems can be corrected by adjusting the listening time. By recording the vibrational source start time, seismic data listening time can be modified to greater than or equal to the lag time between vibrational sources. The data can then be source separated and the seismic data may be processed and/or interpreted.

Example 3

Source Point Recorder Adjustment

By using a source point recorder, lag time is automatically recorded. Each independent vibrational source is automatically monitored for start time, the source signature for each source is recorded and variations can be used to modify the seismic data. This improvement provides several levels of correction because the source signature records a) the source signal, b) signal transmission, and c) lag time thus allowing modification of the seismic data for problems with any one of these source errors and automatically recording a variety of parameters by simply adding one source point receiver channel per energy source.

Although the systems and processes described herein have been described in detail, it should be understood that various changes, substitutions, and alterations can be made without departing from the spirit and scope of the invention as defined by the following claims.

REFERENCES

All of the references cited herein are expressly incorporated by reference. Incorporated references are listed again here for convenience:

1. U.S. Ser. No. 11/855,776 filed Sep. 14, 2007, Olson, et al., "Method and Apparatus for Pre-Inversion Noise Attenuation of Seismic Data."
2. U.S. Ser. No. 11/933,522 filed Nov. 1, 2007, Chiu, et al., "Method and Apparatus for Minimizing Interference Between Seismic Systems."
3. U.S. Ser. No. 12/167,683 filed Jul. 3, 2008, Brewer, et al., "Marine Seismic Acquisition with Controlled Streamer Flaring."
4. U.S. Ser. No. 61/109,279 filed Oct. 29, 2008, Eick, et al., "Variable Timing ZENSEIS™."
5. U.S. Ser. No. 61/109,329 filed Oct. 29, 2008, Chiu, et al., "Simultaneous Multiple Source Extended Inversion."
6. U.S. Ser. No. 61/109,403 filed Oct. 29, 2008, Eick, et al., "Marine Seismic Acquisition."
7. U.S. Ser. No. 61/112,810 filed Nov. 10, 2008, Brewer, et al., "4D Seismic Signal Analysis."
8. U.S. Ser. No. 61/112,875 filed Nov. 10, 2008, Eick and Brewer, "Practical Autonomous Seismic Recorder Implementation and Use."
9. U.S. Ser. No. 61/121,976 filed Dec. 12, 2008, Cramer et al., "Controlled Source Fracture Monitoring."

10. U.S. Pat. No. 3,972,019, Seismograph Service Corp., "Time Synchronization" (Jul. 27, 1976).
11. U.S. Pat. No. 4,281,403, Litton Resources Systems, Inc., "Seismic Data Recording Method and Apparatus" (Jul. 28, 1981).
12. U.S. Pat. No. 4,879,696, Exxon Production Research, "Method and Apparatus for Initiating Seismic Data Storage in an Isolated Distributed Recording System" (Nov. 7, 1989).
13. U.S. Pat. No. 4,885,724, Amoco Corp., "Cableless Seismic Digital Field Recorder Having On-Site Seismic Data Processing Capabilities" (Dec. 5, 1989)
14. U.S. Pat. No. 5,721,710, Atlantic Richfield Co. & Mobil Oil Corp., "High Fidelity Vibratory Source Seismic Method with Source Separation" (Feb. 24, 1998).
15. U.S. Pat. No. 6,754,590, WesternGeco, L.L.C., "Seismic Surveying Method" (Jun. 22, 2004).
16. U.S. Pat. No. 6,883,638, Input/Output, Inc., "Accelerometer Transducer Used for Seismic Recording" (Apr. 26, 2005).
17. U.S. Pat. No. 7,012,853, Input/Output, Inc., "Seismic Data Acquisition Apparatus and Method" ( )
18. U.S. Pat. No. 7,295,490, ConocoPhillips Co., "High Fidelity Vibratory Seismic (HFVS): Optimal Phase-Encoding Selection" (Nov. 13, 2007).
19. US20080137476, Eick, et al., "Dynamic Source Parameter Selection for Seismic Vibrator Data Acquisition" (Jun. 12, 2008)
20. WO199718491, Mobil Oil Corp., "Plural Vibrator Single Step Inversion Separation Method" (May 22, 1997).
21. WO200116622, Trimble Navigation Ltd., "Control of Sources in Survey Operations" (Mar. 8, 2001).
22. WO2005019865, Exxon Mobil Upstream Research Co., "Method for Continuous Sweeping and Separation of Multiple Seismic Vibrators" (Mar. 3, 2005)
23. WO2007040743, ExxonMobil Upstream Res. Co., "Method for Performing Controlled Source Electromagnetic Surveying with Multiple Transmitters" (Apr. 12, 2007).
24. EP0861450, Mobil Oil Corp., "Plural Vibrator Single Step Inversion Separation Method" (Sep. 2, 1998).

We claim:

1. A seismic recording system comprising:
  a) two or more seismic energy sources, and
  b) one or more data recorders,
  wherein said seismic energy sources are operated asynchronously with a random or non-uniform lag between consecutive sweeps, said energy source signatures are recorded, and said data is synchronized through inversion of the recorded data by the energy source signatures.

2. The seismic recording system of claim 1, wherein said energy sources are selected from the group consisting of a ZENSEIS™, vibroseis, seismic vibrator, high fidelity vibratory seismic (HFVS), cascaded HFVS, combined HFVS, and combinations thereof.

3. The seismic recording system of claim 1, wherein said data recorder comprises one or more data receivers selected from the group consisting of a geophone, hydrophone, accelerometer, electrodynamic receiver, and combinations thereof.

4. The seismic recording system of claim 1, wherein one or more source point recorders is located at or adjacent to the seismic energy source.

5. A method of recording seismic data comprising:
  a) deploying one or more seismic data receivers;
  b) deploying two or more seismic energy sources;
  c) deploying at least one source point recorder comprising a seismic data receiver for each seismic energy source;
  d) transmitting seismic energy from a the seismic energy sources; and
  e) recording seismic data from each recorder
  wherein said seismic energy sources are operated asynchronously with a random or non-uniform lag between consecutive sweeps, said energy source signatures are recorded, and said data is synchronized through inversion of the recorded data by the energy source signatures.

6. The method of claim 5, wherein said energy sources are selected from the group consisting of a ZENSEIS™, vibroseis, seismic vibrator, high fidelity vibratory seismic (HFVS), cascaded HFVS, combined HFVS, and combinations thereof.

7. The method of claim 5, wherein said data recorder comprises a data receiver selected from group consisting of a geophone, hydrophone, accelerometer, electrodynamic receiver, and combinations thereof.

8. A seismic recording system comprising:
  a) more than one asynchronous seismic energy source, and
  b) multiple siesmic data recorders,
  wherein said seismic energy sources are accompanied by a source point recorder to record source lag time and said source point recorder is the same as the seismic data recorders, and said seismic energy sources are operated asynchronously with a random or non-uniform lag between consecutive sweeps.

9. The seismic recording system of claim 8, wherein said seismic energy source is selected from the group consisting of a ZENSEIS™, vibroseis, seismic vibrator, high fidelity vibratory seismic (HFVS), cascaded HFVS, combined HFVS, and combinations thereof.

10. The seismic recording system of claim 8, wherein said seismic data recorder comprises one or more data receivers selected from the group consisting of a geophone, hydrophone, accelerometer, gravitometer, electrodynamic receiver, and combinations thereof.

11. A method of recording seismic data comprising:
  a) deploying more than one seismic data recorder comprising a data receiver;
  b) transmitting seismic energy from two or more seismic energy sources said energy source comprising a source point recorder; and
  c) simultaneously recording source energy data and seismic data
  wherein said seismic energy sources are operated asynchronously with a random or non-uniform lag between consecutive sweeps, said energy source signatures are recorded, and said data is synchronized through inversion of the recorded data by the energy source signatures.

12. The method of claim 11, wherein said seismic energy source is selected from the group consisting of a ZENSEIS™, vibroseis, seismic vibrator, high fidelity vibratory seismic (HFVS), cascaded HFVS, combined HFVS, and combinations thereof.

13. The method of claim 11, wherein said data recorder comprises a data receiver selected from the group consisting of a geophone, hydrophone, accelerometer, electrodynamic receiver, and combinations thereof.

14. The method of claim 1, wherein said random lag is from 1 ms to 10 seconds wherein the lag allows independent signal encoding.

15. The method of claim 1, wherein each seismic energy source emits a distinct seismic energy source signature.

16. The method of claim 5, wherein said random lag is from 1 ms to 10 seconds wherein the lag allows independent signal encoding.

17. The method of claim 5, wherein each seismic energy source emits a distinct seismic energy source signature.

18. The method of claim 8, wherein said random lag is from 1 ms to 10 seconds wherein the lag allows independent signal encoding.

19. The method of claim 8, wherein each seismic energy source emits a distinct seismic energy source signature.

20. The method of claim 11, wherein said random lag is from 1 ms to 10 seconds wherein the lag allows independent signal encoding.

21. The method of claim 11, wherein each seismic energy source emits a distinct seismic energy source signature.

* * * * *